(12) United States Patent
Templin (10) Patent No.: US 8,550,822 B2
(45) Date of Patent: *Oct. 8, 2013

(54) METHOD FOR ESTIMATING EXAMINEE ATTRIBUTE PARAMETERS IN COGNITIVE DIAGNOSIS MODELS

(75) Inventor: Jonathan Templin, Champaign, IL (US)

(73) Assignee: Educational Testing Service, Princeton, NJ (US)

( * ) Notice: Subject to any disclaimer, the term of this patent is extended or adjusted under 35 U.S.C. 154(b) by 981 days.

This patent is subject to a terminal disclaimer.

(21) Appl. No.: 12/591,036

(22) Filed: Nov. 5, 2009

(65) Prior Publication Data

US 2010/0112541 A1    May 6, 2010

Related U.S. Application Data

(62) Division of application No. 10/924,069, filed on Aug. 23, 2004, now Pat. No. 7,628,614.

(51) Int. Cl.
 *G09B 3/00* (2006.01)
(52) U.S. Cl.
 USPC ........... 434/322; 434/323; 434/156; 434/365; 434/308; 434/319; 273/429

(58) Field of Classification Search
 USPC .................. 434/322, 323, 156, 365, 308, 319
 See application file for complete search history.

(56) References Cited

U.S. PATENT DOCUMENTS 6,832,069 B2    12/2004 Stout et al.
7,095,979 B2 *   8/2006 Stout ............................ 434/353

* cited by examiner

*Primary Examiner* — Xuan Thai
*Assistant Examiner* — Banafsheh Hadizonooz
(74) *Attorney, Agent, or Firm* — Jones Day (57) ABSTRACT

A method of determining a mastery level for an examinee from an assessment is disclosed. The method includes receiving one or more of an overall skill level for an examinee, a weight for the overall skill level, a covariate vector for an examinee, and a weight for the covariate vector. An examinee attribute value is computed using one or more of the received values for each examinee and each attribute. The computation of the examinee attribute values can include estimating the value using a Markov Chain Monte Carlo estimation technique. Examinee mastery levels are then assigned based on each examinee attribute level. Dichotomous or polytomous levels can be assigned based on requirements for the assessment.

22 Claims, 7 Drawing Sheets

MHG step for $\pi_j^*$

Proposal distribution $\sim U(L_t, U_t)$
    Prior distribution $\sim U(0, 1)$
    Accepted with probability $\min(1, r_{MH})$ MHG step for $r_{jk}^*$     Proposal distribution $\sim U(L_t, U_t)$
    Prior distribution $\sim U(0, 1)$
    Accepted with probability $\min(1, r_{MH})$ MHG step for $c_j$     Proposal distribution $\sim U(L_t, U_t)$
    Prior distribution $\sim U(0, 3)$
    Accepted with probability $\min(1, r_{MH})$

METHOD FOR ESTIMATING EXAMINEE ATTRIBUTE PARAMETERS IN COGNITIVE DIAGNOSIS MODELS

CROSS-REFERENCE TO RELATED APPLICATION

This application is a divisional of U.S. patent application Ser. No. 10/924,069, filed Aug. 23, 2004, now U.S. Pat. No. 7,628,614 the entire content of which is incorporated herein by reference.

TECHNICAL FIELD

The present invention relates generally to the field of assessment evaluation. In particular, the invention relates to a method and system for evaluating assessment examinees on a plurality of attributes based on responses to assessment items.

BACKGROUND

Standardized testing is prevalent in the United States today. Such testing is often used for higher education entrance examinations and achievement testing at the primary and secondary school levels. The prevalence of standardized testing in the United States has been further bolstered by the No Child Left Behind Act of 2001, which emphasizes nationwide test-based assessment of student achievement.

The typical focus of research in the field of assessment measurement and evaluation has been on methods of item response theory (IRT). A goal of IRT is to optimally order examinees along a low dimensional plane (typically unidimensional) based on the examinee's responses and the characteristics of the test items. The ordering of examinees is done via a set of latent variables presupposed to measure ability. The item responses are generally considered to be conditionally independent of each other.

The typical IRT application uses a test to estimate an examinee's set of abilities (such as verbal ability or mathematical ability) on a continuous scale. An examinee receives a scaled score (a latent trait scaled to some easily understood metric) and/or a percentile rank. The final score (an ordering of examinees along a latent dimension) is used as the standardized measure of competency for an area-specific ability.

Although achieving a partial ordering of examinees remains an important goal in some settings of educational measurement, the practicality of such methods is questionable in common testing applications. For each examinee, the process of acquiring the knowledge that each test purports to measure seems unlikely to occur via this same low dimensional approach of broadly defined general abilities. This is, at least in part, because such testing can only assess a student's abilities generally, but cannot adequately determine whether a student has mastered a particular ability or not.

Because of this limitation, cognitive modeling methods, also known as skills assessment or skills profiling, have been developed for assessing students' abilities. Cognitive diagnosis statistically analyzes the process of evaluating each examinee on the basis of the level of competence on an array of skills and using this evaluation to make relatively fine-grained categorical teaching and learning decisions about each examinee. Traditional educational testing, such as the use of an SAT score to determine overall ability, performs summative assessment. In contrast, cognitive diagnosis performs formative assessment, which partitions answers for an assessment examination into fine-grained (often discrete or dichotomous) cognitive skills or abilities in order to evaluate an examinee with respect to his level of competence for each skill or ability. For example, if a designer of an algebra test is interested in evaluating a standard set of algebra attributes, such as factoring, laws of exponents, quadratic equations and the like, cognitive diagnosis attempts to evaluate each examinee with respect to each such attribute. In contrast, summative analysis simply evaluates each examinee with respect to an overall score on the algebra test.

Numerous cognitive diagnosis models have been developed to attempt to estimate examinee attributes. In cognitive diagnosis models, the atomic components of ability, the specific skills that together comprise the latent space of general ability, are referred to as attributes. Examinees are either masters of attributes or non-masters of attributes. The space of all attributes relevant to an examination is represented by the set $\{\alpha_1, \ldots, \alpha_k\}$. Given a test with items $j=1, \ldots, J$, the attributes necessary for each item can be represented in a matrix of size J×K. This matrix is referred to as a Q-matrix having values $Q=\{q_{jk}\}$, where $q_{jk}=1$ when attribute k is required by item j and $q_{jk}=0$ when attribute k is not required by item j. Typically, the Q-matrix is constructed by experts and is pre-specified at the time of the examination analysis.

Cognitive diagnosis models can be sub-divided into two classifications: compensatory models and conjunctive models. Compensatory models allow for examinees who are non-masters of one or more attributes to compensate by being masters of other attributes. An exemplary compensatory model is the common factor model. Low scores on some factors can be compensated by high scores on other factors.

Numerous compensatory cognitive diagnosis models have been proposed including: (1) the Linear Logistic Test Model (LLTM) which models cognitive facets of each item, but does not provide information regarding the attribute mastery of each examinee; (2) the Multicomponent Latent Trait Model (MLTM) which determines the attribute features for each examinee, but does not provide information regarding items; (3) the Multiple Strategy MLTM which can be used to estimate examinee performance for items having multiple solution strategies; and (4) the General Latent Trait Model (GLTM) which estimates characteristics of the attribute space with respect to examinees and item difficulty.

Conjunctive models, on the other hand, do not allow for compensation when critical attributes are not mastered. Such models more naturally apply to cognitive diagnosis due to the cognitive structure defined in the Q-matrix and will be considered herein. Such conjunctive cognitive diagnosis models include: (1) the DINA (deterministic inputs, noisy "AND" gate) model which requires the mastery of all attributes by the examinee for a given examination item; (2) the NIDA (noisy inputs, deterministic "AND" gate) model which decreases the probability of answering an item for each attribute that is not mastered; (3) the Disjunctive Multiple Classification Latent Class Model (DMCLCM) which models the application of non-mastered attributes to incorrectly answered items; (4) the Partially Ordered Subset Models (POSET) which include a component relating the set of Q-matrix defined attributes to the items by a response model and a component relating the Q-matrix defined attributes to a partially ordered set of knowledge states; and (5) the Unified Model which combines the Q-matrix with terms intended to capture the influence of incorrectly specified Q-matrix entries.

The Unified Model specifies the probability of correctly answering an item $X_{ij}$ for a given examinee i, item j, and set of attributes $k=1, \ldots, K$ as:

$$P(X_{ij} = 1 \mid \alpha_i, \theta_i) =$$

$$(1-p)\left[d_j \prod_{k=1}^{K} \pi_{jk}^{\alpha_{ik} \times q_{jk}} r_{jk}^{(1-\alpha_{ik} \times q_{jk})} P_j(\theta_i + \Delta c_j) + (1-d_j)P_j(\theta_i)\right],$$

where $\theta_i$ is the latent trait of examinee i; p is the probability of an erroneous response by an examinee that is a master; $d_j$ is the probability of selecting the pre-defined Q-matrix strategy for item j; $\pi_{jk}$ is the probability of correctly applying attribute k to item j given mastery of attribute k; $r_{jk}$ is the probability of correctly applying attribute k to item j given non-mastery of attribute k; $\alpha_{ik}$ is an examinee attribute mastery level, and $c_j$ is a value indicating the extent to which the Q-matrix entry for item j spans the latent attribute space.

One problem with the Unified Model is that the number of parameters per item is unidentifiable. Accordingly, the Reparameterized Unified Model (RUM) was developed in an attempt to reparameterize the Unified Model in a manner consistent with the original interpretation of the model parameters. For a given examinee i, item j, and Q-matrix defined set of attributes k=1, ..., K, the RUM specifies the probability of correctly answering item $X_{ij}$ as:

$$P(X_{ij} = 1 \mid \alpha_i, \theta_i) = \pi_j^* \prod_{k=1}^{K} r_{jk}^{*(1-\alpha_{ik}) \times q_{jk}} P_{c_j}(\theta_i),$$

where $\pi_j^* = \prod_{k=1}^{K} \pi_{jk}^{q_{jk}}$ (the probability of correctly applying all K Q-matrix specified attributes for item j), $$r_{jk}^* = \frac{r_{jk}}{\pi_{jk}}$$

(the penalty imposed for not mastering attribute k), and $$P_{c_j}(\theta_i) = \frac{e^{(\theta_i + c_j)}}{1 + e^{(\theta_i + c_j)}}$$

(a measure of the completeness of the model).

The RUM is a compromise of the Unified Model parameters that allow the estimation of both latent examinee attribute patterns and test item parameters. The Fusion Model adds a Hierarchical Bayes Markov Chain Monte Carlo (MCMC) algorithm to estimate the parameters of the model. The item parameters in the Fusion model have a prior distribution that is a Beta distribution, β(a, b), where (a, b) are defined for each set of item parameters, π*, r*, and c/3. Each set of hyperparameters is then estimated within the MCMC chain to determine the shape of the prior distribution.

A difference between the Fusion Model and the RUM is that the $\alpha_{ik}$ term is replaced in the Fusion Model with a binary indicator function, $I(\overline{\alpha}_{ik} > \kappa_k)$, where $\overline{\alpha}_{ik}$ is the underlying continuous variable of examinee i for attribute k (i.e., an examinee attribute value), and $\kappa_k$ is the mastery threshold value that $\overline{\alpha}_{ik}$ must exceed for $\alpha_{ik}=1$.

The set of K latent attributes can be considered to form a latent class model with $2^K$ classes. Alternatively, the set of attributes can be considered as defining $2^K$ different latent classes with membership in each latent class estimated for each examinee. It should be noted that cognitive diagnosis models are not entirely analogous to a typical latent class model in that each Q-matrix defines a limited relationship between the set of attributes and the set of test items. For each of the Unified Model, the RUM and Fusion Model, the item response function is not only a function of class membership, but also a function of the continuous individual examinee ability parameter bounded by the item response probability defined by the latent class.

Latent class models and cognitive diagnosis models differ in the meaning of class membership. A latent class pattern can be written as a sequence of binary digits. For example, the latent class "1101" indicates a four-variable Q-matrix with the members of the class being masters of attributes one, two and four and non-masters of attribute three. Latent class models consider class membership by the entire label (i.e., a latent class model would estimate a probability of correct response for examinees lacking the third attribute). In contrast, information pertaining to each of the digits are of interest in the cognitive diagnosis model as educators seek to move each examinee from their current class to the class with label "1111." Thus, binary attribute cognitive diagnosis models represent a subset of latent class models with the ability to connect class membership to item responses in a manner specified by the Q-matrix.

Methods of estimating parameter and ability values in cognitive diagnosis models include maximum likelihood (ML) optimization algorithms and Bayesian MCMC algorithms. ML techniques include (1) Joint ML (JML), which determines the likelihood of answering an item correctly based on the item parameters and examinee parameters; (2) Conditional ML (CML), which substitutes the total correct score for an examinee for the latent abilities of the examinee in the JML equation; and (3) Marginal ML (MML), which performs integration over the examinee attribute for models too complex for computation using the CML algorithm.

MCMC algorithms estimate the set of item (b) and latent examinee (θ) parameters by using a stationary Markov chain, $(A^0, A^1, A^2, \ldots)$, with $A^t = (b^t, \theta^t)$. The individual steps of the chain are determined according to the transition kernel, which is the probability of a transition from state t to state t+1, $P[(b^{t+1}, \theta^{t+1}) \mid (b^t, \theta^t)]$. The goal of the MCMC algorithm is to use a transition kernel that will allow sampling from the posterior distribution of interest. The process of sampling from the posterior distribution can be evaluated by sampling from the distribution of each of the different types of parameters separately. Furthermore, each of the individual elements of the vector can be sampled separately. Accordingly, the posterior distribution to be sampled for the item parameters is $P(b_j \mid X, \theta)$ (across all j) and the posterior distribution to be sampled for the examinee parameters is $P(\theta_i \mid X, b)$ (across all i).

One problem with MCMC algorithms is that the choice of a proposal distribution is critical to the number of iterations required for convergence of the Markov Chain. A critical measure of effectiveness of the choice of proposal distribution is the proportion of proposals that are accepted within the chain. If the proportion is low, then many unreasonable values are proposed, and the chain moves very slowly towards convergence. Likewise, if the proportion is very high, the values proposed are too close to the values of the current state, and the chain will converge very slowly.

While MCMC algorithms suffer from the same pitfalls of JML optimization algorithms, such as no guarantee of consistent parameter estimates, a potential strength of the MCMC approaches is the reporting of examinee (binary) attribute estimates as posterior probabilities. Thus, MCMC algorithms can provide a more practical way of investigating cognitive diagnosis models.

Different methods of sampling values from the complete conditional distributions of the parameters of the model include the Gibbs sampling algorithm and the Metropolis-Hastings within Gibbs (MHG) algorithm. Each of the cognitive diagnosis models fit with MCMC used the MHG algorithm to evaluate the set of examinee variables because the Gibbs sampling algorithm requires the computation of a normalizing constant. A disadvantage of the MHG algorithm is that the set of examinee parameters are considered within a single block (i.e., only one parameter is variable while other variables are fixed). While the use of blocking speeds up the convergence of the MCMC chain, efficiency may be reduced. For example, attributes with large influences on the likelihood may overshadow values of individual attributes that are not as large.

What is needed is a method for performing cognitive diagnosis that evaluates examinees on individual skills using an overall skill ability.

A further need exists for a method for evaluating examinees on individual skills using covariates.

A further need exists for a method that considers each attribute separately when assessing examinees.

A still further need exists for a method of classifies examinees using polytomous attribute skill levels.

The present invention is directed to solving one or more of the problems described above.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to an "assessment item" is a reference to one or more assessment items and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior distribution invention.

In an embodiment, a method for determining one or more examinee attribute mastery levels from an assessment includes receiving an overall skill level for an examinee, and, for each of one or more attributes, receiving a weight for the overall skill level, computing an examinee attribute value based on at least the overall skill level, the weight corresponding to the attribute and one or more responses made by the examinee to one or more questions pertaining to the attribute on the assessment, and assigning an examinee attribute mastery level for the examinee with respect to the attribute based on whether the examinee attribute value surpasses one or more thresholds. The overall skill level is a rating of the examinee's performance on at least a portion of an assessment. Computing an examinee attribute value may include computing a product of the overall skill level and the weight, and summing the product and a value based on the one or more responses.

In an embodiment, the method further includes receiving a covariate vector for an examinee, and receiving, for each attribute, a weighting vector for the covariate vector. The covariate vector includes a value for each of one or more covariates for the examinee. The examinee attribute value is further based on the covariate vector and the weighting vector. Computing an examinee attribute value may include computing a product of the overall skill level and the weight, computing a vector product of the covariate vector and the weighting vector for the attribute, and summing the product, the vector product and a value based on the one or more responses.

In an embodiment, a method for determining one or more examinee attribute mastery levels from an assessment includes receiving a covariate vector for an examinee, and, for each of one or more attributes, receiving a weighting vector for the covariate vector, computing an examinee attribute value based on at least the covariate vector, the weighting vector and one or more responses made by the examinee to one or more questions pertaining to the attribute on an assessment, and assigning an examinee attribute mastery level for the examinee with respect to the attribute based on whether the examinee attribute value surpasses one or more thresholds. The covariate vector includes a value for each of one or more covariates for the examinee. Computing an examinee attribute value may include computing a vector product of the covariate vector and the weighting vector, and summing the vector product and a value based on the one or more responses.

In an embodiment, a method for determining examinee attribute mastery levels includes, for each item on an assessment, determining an estimated value for each of one or more item parameters, for each proficiency space parameter, determining an estimated value for the proficiency space parameter, for each examinee parameter, determining an estimated value for the examinee parameter for each examinee, determining each item parameter, proficiency space parameter and examinee parameter a predetermined number of times, and determining one or more examinee attribute mastery levels based on the item parameters, proficiency space parameters, and examinee parameters.

In an embodiment, determining an estimated value for each of one or more item parameters includes performing a Metropolis-Hastings within Gibbs step for updating an estimate of a probability of correctly applying all attributes described in a Q-matrix for an item if each attribute for the item is mastered, performing a Metropolis-Hastings within Gibbs step for updating an estimate of a penalty imposed on the probability of correctly applying all attributes in the Q-matrix if an examinee has not mastered a particular attribute, and performing a Metropolis-Hastings within Gibbs step for updating an estimate of a measure of whether the attributes in the Q-matrix adequately describe attributes necessary for answering the item.

In an embodiment, determining an estimated value for each of one or more item parameters further includes for each parameter specified by the Q-matrix, performing a Metropolis-Hastings within Gibbs step for updating an estimate of a penalty exponent, which links an examinee attribute mastery level and a Q-matrix entry, for a penalty imposed on the probability of correctly applying all attributes in the Q-matrix if an examinee has not mastered a particular attribute, and determining an estimated value for each proficiency space parameter includes for each attribute, performing a Metropolis-Hastings within Gibbs step for updating an estimate of an overall skill level weighting factor, for each attribute and each of one or more mastery ranges, performing a Metropolis-Hastings within Gibbs step for updating an estimate for each of one or more mastery thresholds, for each examinee, performing a Metropolis-Hastings within Gibbs step for updating an estimate of an overall skill level for an examinee, and for each covariate, attribute and continuous examinee parameter, performing a Metropolis-Hastings within Gibbs step for updating an estimate for each element of a covariate weighting vector.

In an embodiment, determining an estimated value for each proficiency space parameter includes for each attribute, performing a Metropolis-Hastings within Gibbs step for updating an estimate of an overall skill level weighting factor, for each attribute, performing a Metropolis-Hastings within Gibbs step for updating an estimate of a mastery threshold, for each examinee, performing a Metropolis-Hastings within Gibbs step for updating an estimate of an overall skill level for the examinee, and for each covariate, attribute and continuous examinee parameter, performing a Metropolis-Hastings within Gibbs step for updating an estimate of each element of a covariate weighting vector.

In an embodiment, determining an estimated value for each examinee parameter includes, for each examinee performing a Gibbs step for updating an estimate of an examinee attribute mastery value, and performing a Metropolis-Hastings within Gibbs step for updating an estimate of a latent ability value.

In an embodiment, a method of updating an estimate of a value from a moving window distribution includes receiving a prior estimate of a value, receiving a base interval for a moving window distribution having an absolute lower limit and an absolute upper limit, receiving a width for the moving window distribution, determining a minimum selectable value equal to the maximum of i) the prior estimate of the value minus half of the width of the moving window distribution and ii) the absolute lower limit, determining a maximum selectable value equal to the minimum of i) the prior estimate of the value plus half of the width of the moving window distribution and ii) the absolute upper limit, selecting the estimate for the value from a uniform distribution between the minimum selectable value and the maximum selectable value.

BRIEF DESCRIPTION OF THE DRAWINGS

The accompanying drawings, which are incorporated in and form a part of the specification, illustrate various embodiments and, together with the description, serve to explain the principles of the various embodiments.

DETAILED DESCRIPTION

Figure 1:
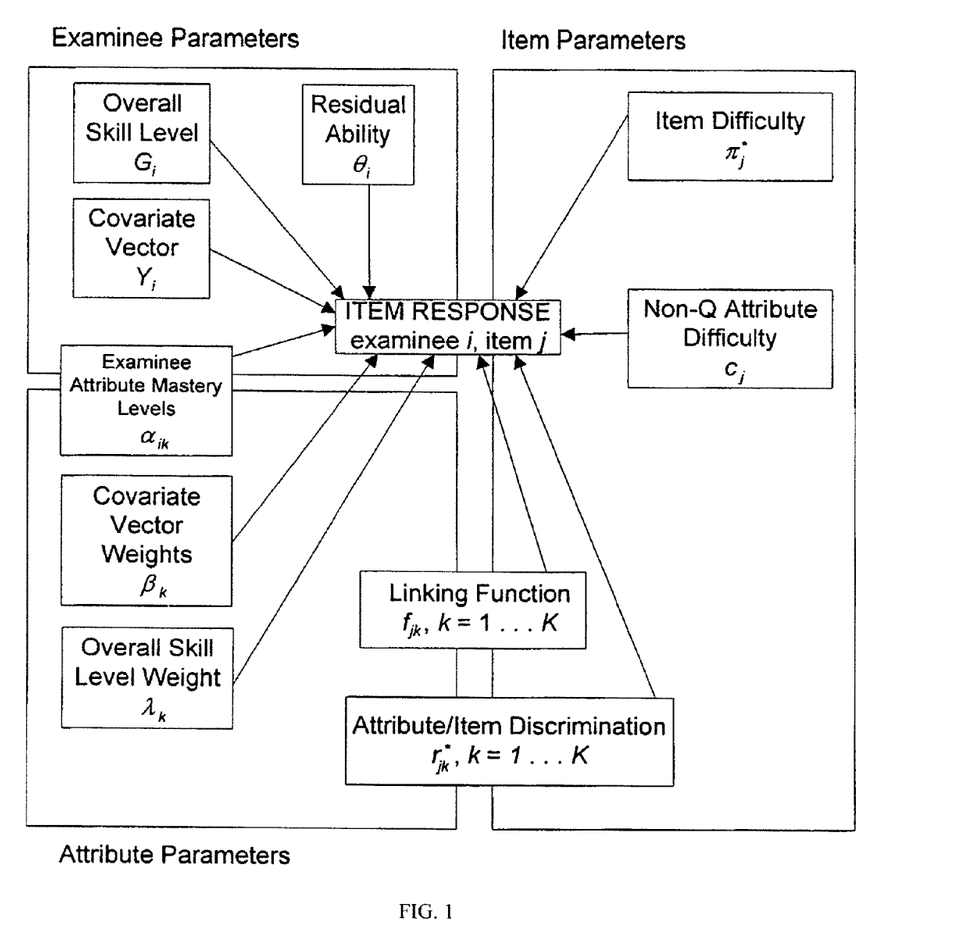
FIG. 1 depicts an exemplary probabilistic structure for an item response according to an embodiment.
Figure 2:
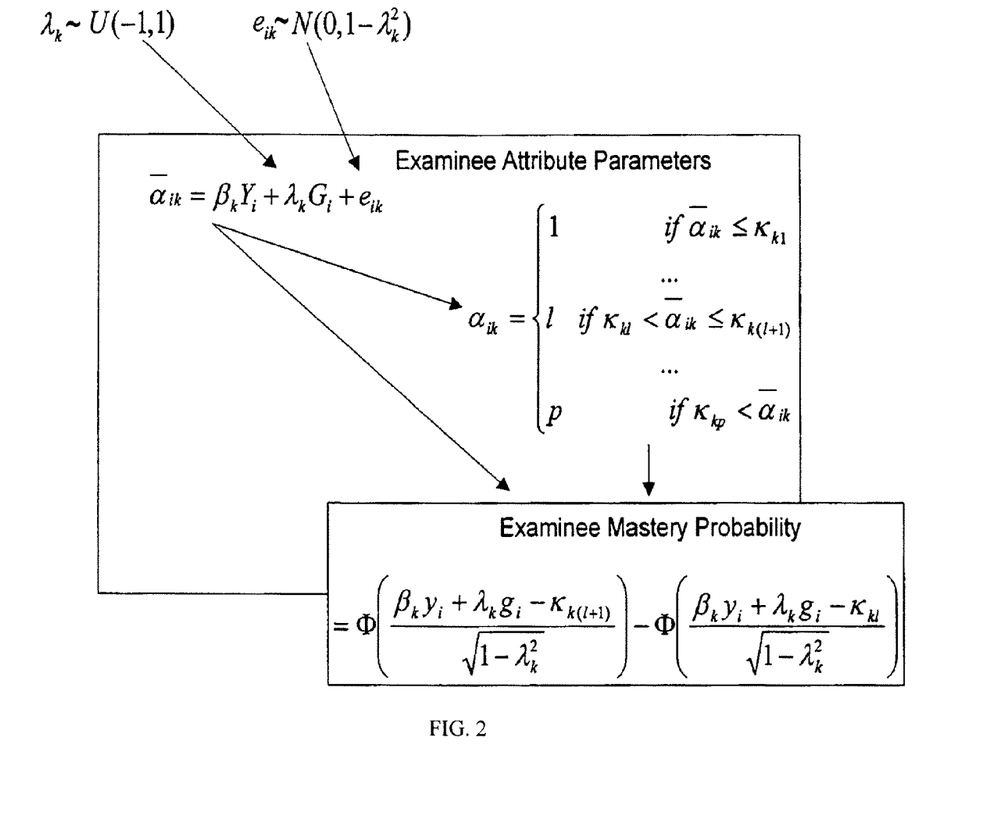
FIG. 2 depicts an exemplary hierarchical Bayesian model for the examinee parameters according to an embodiment.
Figure 3:
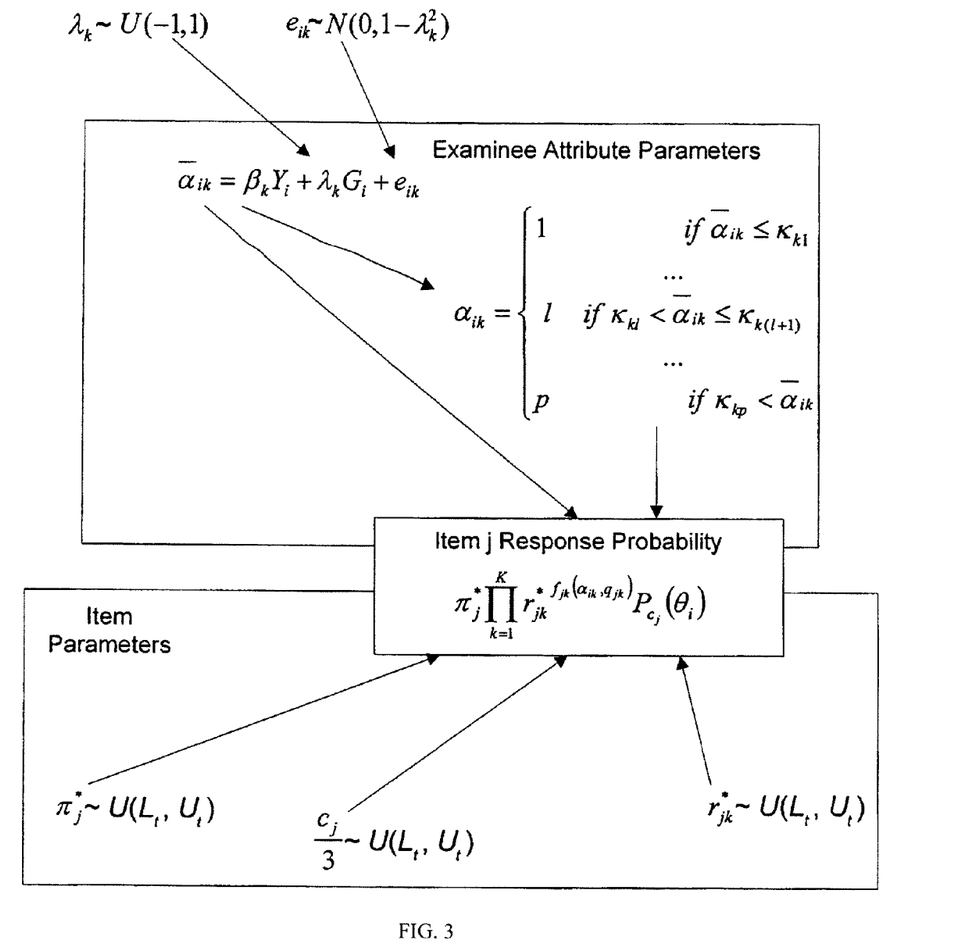
FIG. 3 depicts an exemplary hierarchical Bayesian model according to an embodiment.
Figure 4:
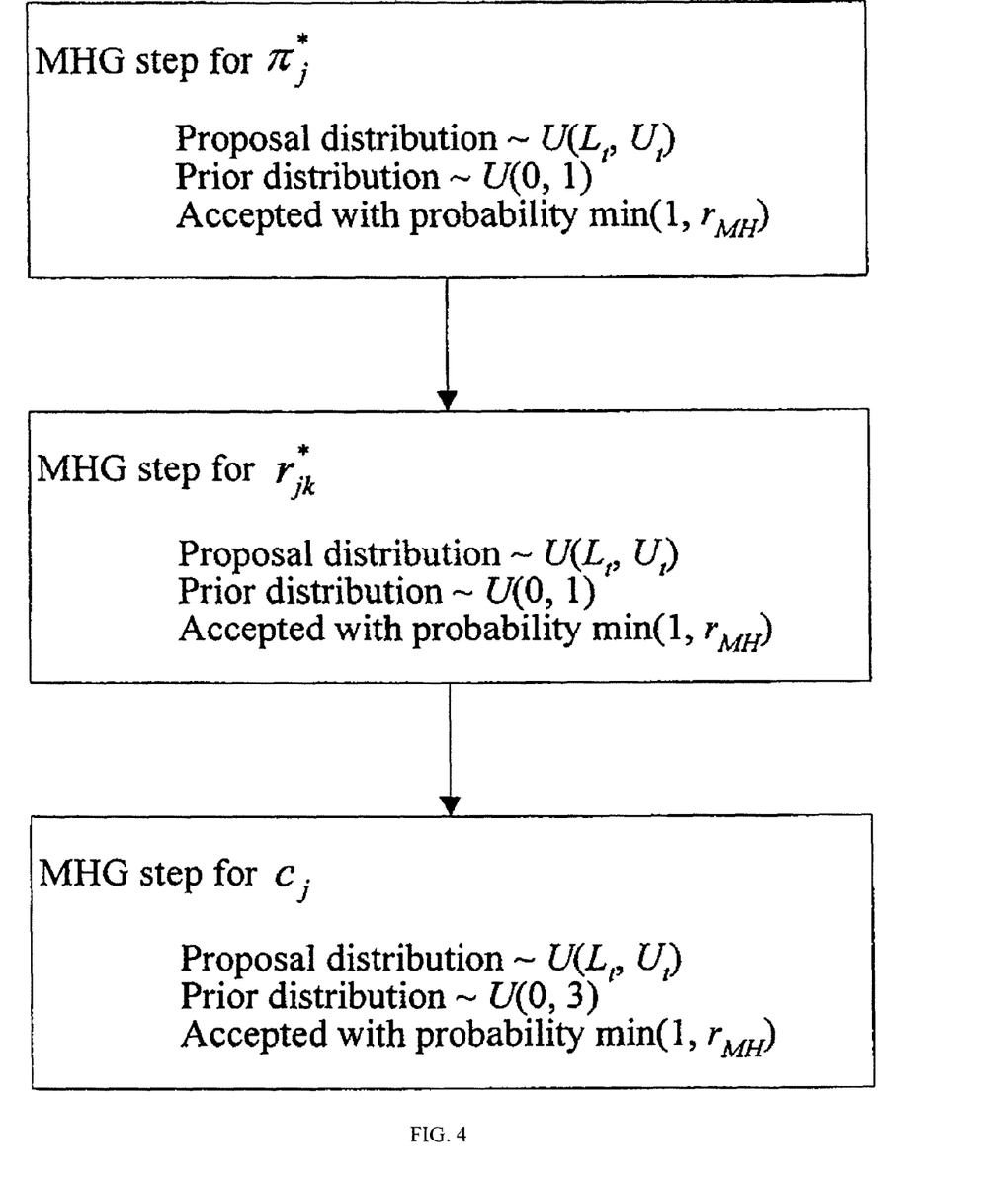
FIG. 4 depicts an exemplary flowchart for estimating one or more item parameters according to an embodiment.
Figure 5:
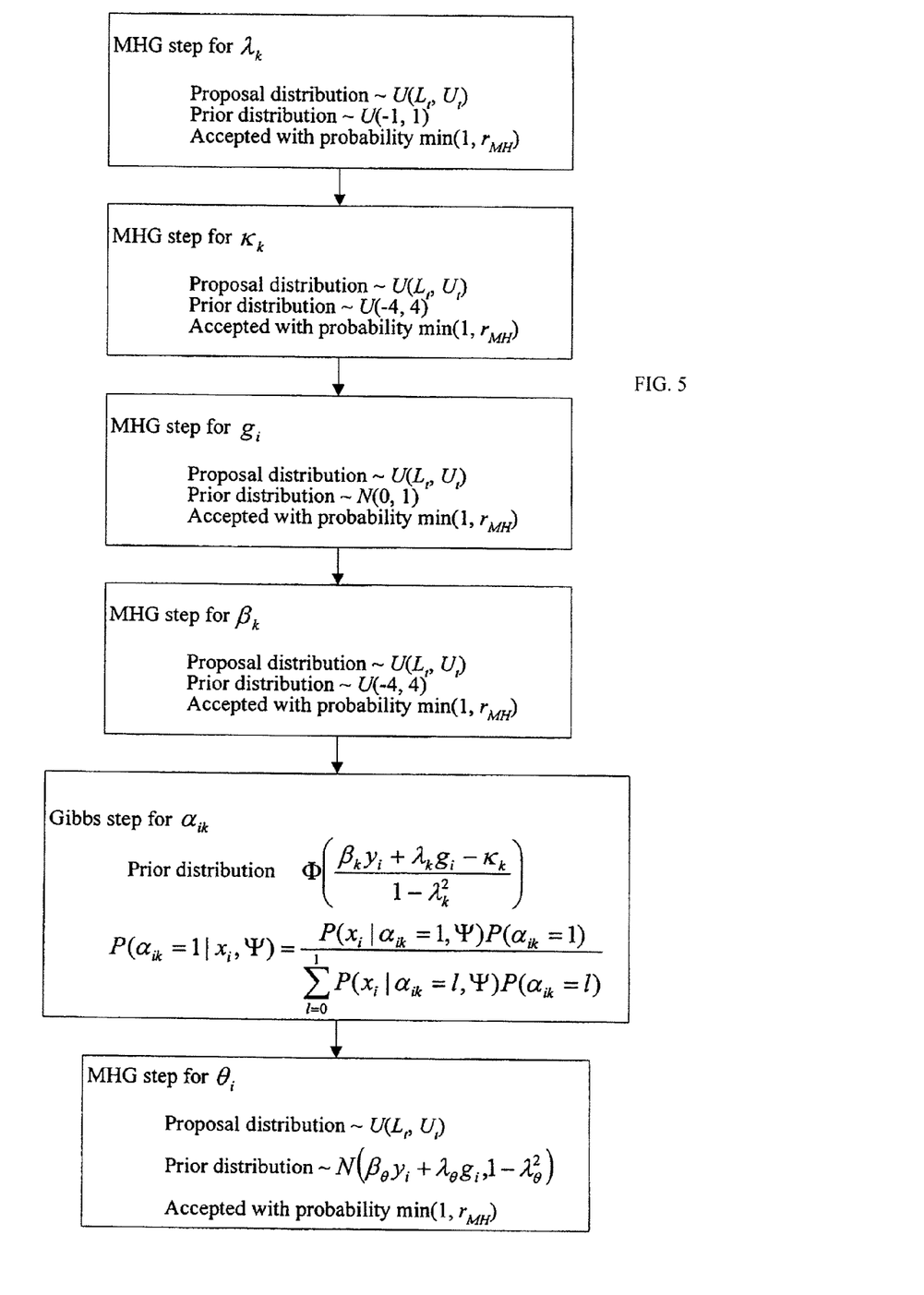
FIG. 5 depicts an exemplary flowchart for estimating one or more proficiency space parameters and one or more examinee parameters according to an embodiment.
Figure 6:
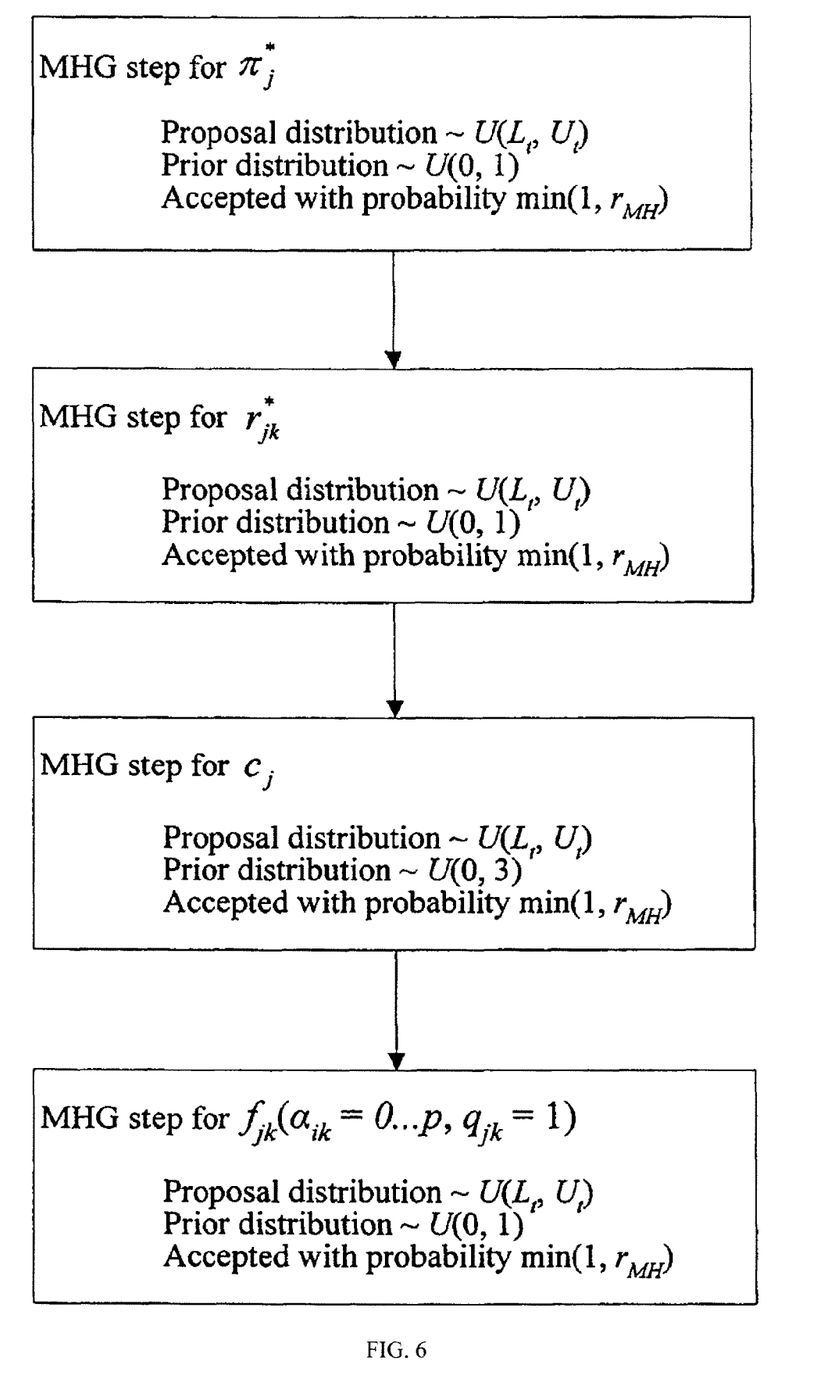
FIG. 6 depicts an exemplary flowchart for estimating one or more item parameters according to an embodiment.
Figure 7:
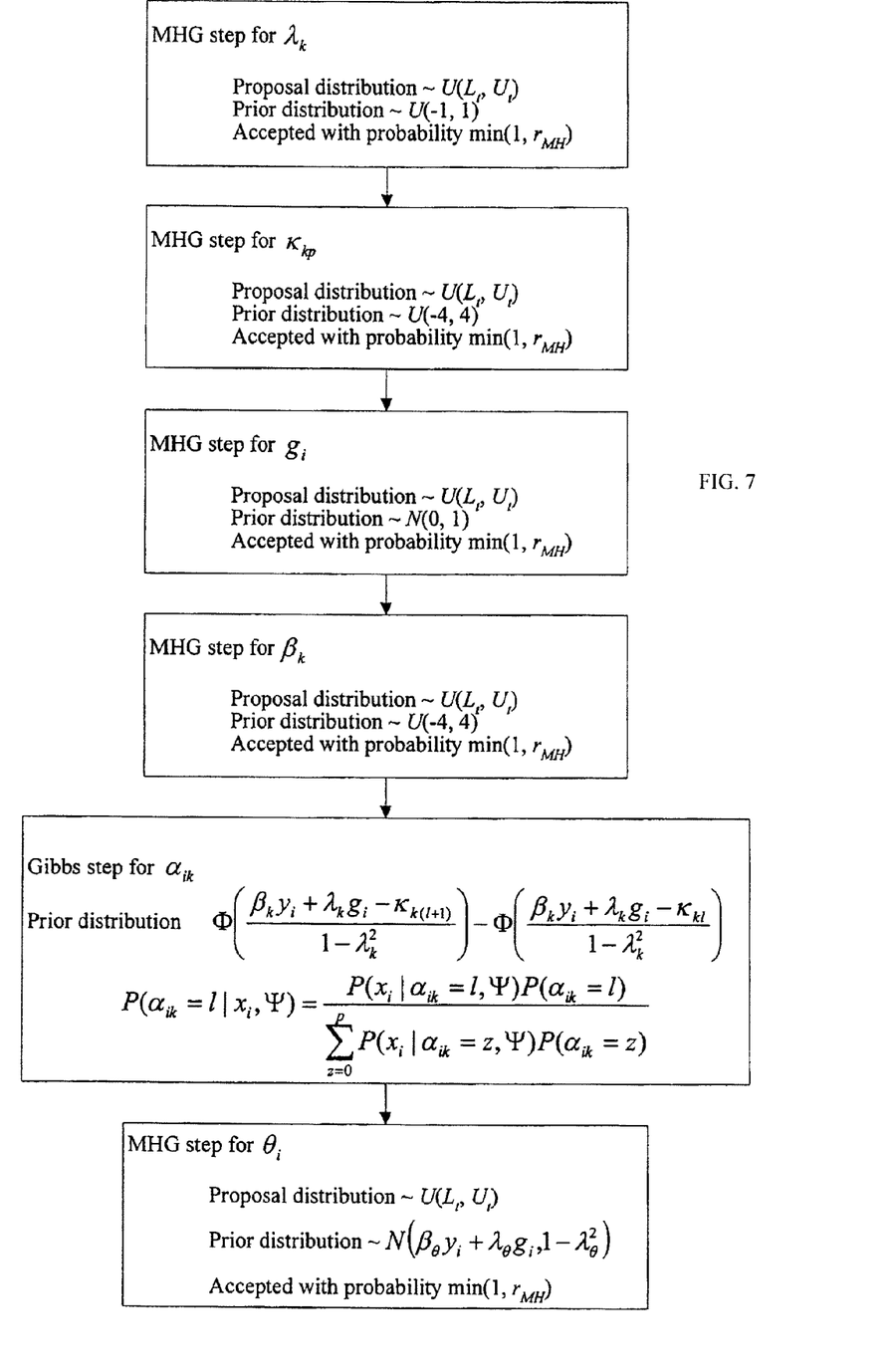
FIG. 7 depicts an exemplary flowchart for estimating one or more proficiency space parameters and one or more examinee parameters according to an embodiment.

The present invention relates to a method and system for evaluating assessment examinees on a plurality of attributes based on responses to assessment items.

Considering each attribute separately, the full conditional distribution for a Gibbs sampling step for each attribute may be computed. The posterior distribution for each attribute may be a Bernoulli distribution, such that $P(\alpha_{ik}=1|X_i=x_i,\Psi)\sim B(1,v_{ik})$, where $\Psi$ is the set of all variables excluding the attribute $\alpha_{ik}$. For example, under the RUM, the vector $\Psi$ may include all of the item parameters, the continuous examinee parameter $\theta_i$, and all other attributes:

$$\Psi = (\pi_1^*, \pi_2^*, \ldots \pi_J^*, r_{11}^*, r_{21}^*, \ldots, r_{JK}^*, c_1, c_2, \ldots, c_J, \theta_i, \alpha_{i,l \neq k})'.$$

The probability of attribute mastery, $v_{ik}$ may be the full conditional probability that examinee i is a master of attribute k. Using Bayes' Theorem, this probability is equivalent to $$P(\alpha_{ik} = 1 | x_i, \Psi) = \frac{P(x_i | \alpha_{ik} = 1, \Psi) P(\alpha_{ik} = 1)}{\sum_{l=0}^{1} P(x_i | \alpha_{ik} = 1, \Psi) P(\alpha_{ik} = l)},$$

where $P(\alpha_{ik}=1)$ is the prior distribution of $\alpha_{ik}$.

The Gibbs examinee attribute parameter step detailed below may eliminate the need for the set of underlying continuous variables required by the Fusion Model. While the RUM is used as the cognitive diagnosis model in the description contained herein, the algorithm presented is not exclusive to the RUM. Any cognitive diagnosis model may use a similar Gibbs sampling procedure to estimate the attribute patterns of examinees.

The conditional probability that examinee i is a master of attribute k, $v_{ik}$, may be central to the Gibbs sampling estimation procedure. $v_{ik}$ may be conditional on the data and all other parameters in the model. As defined, the prior distribution for attribute mastery may be modeled in a plurality of different ways, such as by using a higher order trait model or examinee covariate information such as gender, class year or location of school district.

Examinee covariates may be used in the estimation of traditional item response theory ("IRT") models. When estimated simultaneously with examinee variables, covariates may indirectly improve the accuracy of item parameter estimates.

One type of examinee level covariate is the higher order latent trait. Higher order latent traits may be fit with single and multiple strategy DINA and reparameterized NIDA models. The higher order latent trait may model the joint distribution of the attributes. A logistic link function may be used to model the attributes, such as:

$$P(\alpha_{ik} | G_i) = \frac{e^{(\lambda_{0k} + \lambda_{1k} G)}}{1 + e^{(\lambda_{0k} + \lambda_{1k} G)}},$$

where $\alpha_{ik}$ is the value of the $k^{th}$ attribute for the $i^{th}$ examinee, $G_i$ is the continuous higher order trait for examinee i (i.e., the overall ability of examinee i), and ($\lambda_{0k}$, $\lambda_{1k}$) are the parameters linking the $k^{th}$ attribute to the higher order trait. The parameters ($\lambda_{0k}$, $\lambda_{1k}$) may be similar to the item parameters of a 2PL model.

Information regarding the characteristics of the proficiency space of the examinee parameters may be needed. The levels of mastery of a set of dichotomous attributes prevalent in a population may be particularly informative. Moreover, the correlation structure of the attributes defined by a Q-matrix may provide information regarding the nature of the association of the examinee attribute parameters. Additionally, in large scale administrations of achievement tests, subpopulation performance characteristics (such as examining if men and women perform differently) may be of great concern. Modeling the proficiency space to gain information regarding its critical features may be performed using a hierarchical Bayesian approach of estimating the hyperparameters of the distribution of examinee parameters.

The generalized linear mixed model may be used to determine population mastery, proficiency space correlation and covariate inclusion. A generalized linear mixed model parameterization for modeling the proficiency space expressing the probability that examinee i is a master of attribute k may be linearly modeled as $\bar{\alpha}_{ik}=\beta_k Y_i + \lambda_k G_i + e_{ik}$, where $I(\alpha_{ik}=1)=I$ $\bar{\alpha}_{ik} > \kappa_k$) and $\kappa_k$ is the attribute-specific cut point (mastery threshold) that determines the population proportion of masters. The elements of vector $\beta_k$ are the weights of the corresponding covariates contained in the vector $Y_i$. The parameter $\lambda_k$ is the loading of attribute k onto the higher order trait $G_i$. $\lambda_k$ may range between (−1, 1), although positive values are expected in the context of mental traits $e_{ik}$, includes error terms having a form $N(0,1-\lambda_k^2)$ and independent of $G_i$ and $Y_i$ for all i. Accordingly, $P(\bar{\alpha}_{ik}|G_i=g_i, Y_i=y_i) \sim (\beta_k y_i + \lambda_k g, 1-\lambda_k^2)$, where $g_i$ is the realization of the higher order trait $G_i$. The hierarchical Bayesian prior distribution is thus:

$$P(\alpha_{ik} = 1 \mid G_i = g_i, Y_i = y_i) = P(\bar{\alpha}_{ik} > \kappa_k \mid g_i, y_i) = \Phi\left(\frac{\beta_k y_i + \lambda_k g_i - \kappa_k}{\sqrt{1-\lambda_k^2}}\right),$$

where $\Phi(\bullet)$ is the standard normal cumulative distribution function ("CDF").

Similarly, the RUM features a continuous examinee parameter, $\theta_i$, which may be modeled as $\theta_i = \beta_\theta Y_i + \lambda_\theta G_i + e_{i\theta}$ and $P(\theta|G_i=g_i, Y_i=y_i) \sim N(\beta_\theta y_i + \lambda_\theta g_i, 1-\lambda_\theta^2)$.

The algorithm for the estimation of the RUM using the generalized linear mixed proficiency space model may include modeling item parameters, proficiency space parameters and examinee parameters. In each of a predetermined number of iterations, each of the item parameters may be estimated. Then, each of the parameters in the proficiency space model may be estimated before the examinee parameters ($\alpha_{ik}$ and $\theta_i$) are estimated for each examinee.

In an embodiment, a model MCMC algorithm uses both Gibbs sampling (for the examinee attribute parameters) and the Metropolis-Hastings within Gibbs algorithm (MHG). Other embodiments of the MCMC algorithm may use only the Gibbs sampling or MHG for all parameters or use Gibbs sampling or MHG for different parameters than in the described MCMC algorithm. For each MHG step, candidate values may be drawn from a moving window family of proposal distributions.

A moving window proposal distribution may generate efficient proposals with easily computed transition probability ratios. The proposal value for step t, with specified maximum width w on the interval [a,b], is defined as $\tau^* \sim U(L_t, U_t)$ where $$L_t = \max\left(\tau^{t-1} - \frac{w}{2}, a\right)$$

and $$W_t = \left(\tau^{t-1} + \frac{w}{2}, b\right).$$

Thus, the proposal distribution is a family of uniform distributions centered at $\tau^{t-1}$ if the whole width is included in the parameter space, and is asymmetric if not. If the distribution is asymmetric, the ratio of the transition probabilities is the ratio of the heights of the uniform rectangles.

Under MHG, for a given item parameter $\tau$, the probability of acceptance of a candidate parameter $\tau^*$ is min(1, $r_{MH}$), where $$r_{MH} = \prod_{i=1}^{I} \prod_{j=1}^{J} \frac{\left[(P_{RUM}(\tau^*))^{X_{ij}}(1 - P_{RUM}(\tau^*))^{(1-X_{ij})}\right]}{\left[(P_{RUM}(\tau_{t-1}))^{X_{ij}}(1 - P_{RUM}(\tau_{t-1}))^{(1-X_{ij})}\right]} \cdot \frac{P(\tau^*)Q(\tau_{t-1} \mid \tau^*)}{P(\tau_{t-1})Q(\tau^* \mid \tau_{t-1})} \quad \text{(Eqn. 1)}$$

$\tau^{t-1}$ is the value of the item parameter from the previous step in the chain. The function $P_{RUM}(\tau)$ is the likelihood value of an item response function, such as $$\pi_j^* \prod_{k=1}^{K} r_{jk}^{*(1-a_{ik})\times q_{jk}} P_{c_j}(\theta_i),$$

using the data and the parameters specified in the chain. The values $Q(\tau_{t-1}\tau^*)$ and $Q(\tau^*|\tau_{t-1})$ are the proposal probabilities given by the ratio of heights of the uniform proposal distributions. The values $P(\tau^*)$ and $P_{(\tau t-1)}$ are the prior distribution probabilities of the parameters.

The model algorithm's item parameter meta-step (performed over all items j) may include: (1) a MHG step for $\pi^*_j$, (2) a MHG step for $r^*_{jk}$, for each parameter separately, with parameters specified by the Q-matrix, and (3) a MHG step for $c_j$.

The MHG step for $\pi^*_j$ may include drawing $\pi^*_j$ from a uniform moving window proposal distribution, $U(L_t, U_t)$. The prior distribution for $\pi^*_j$ is $U(0, 1)$. The candidate parameters may be accepted with probability min(1, $r_{MH}$) where $r_{MH}$ is defined in Eqn. 1.

The MHG step for $r^*_{jk}$ may include drawing $r^*_{jk}$ from a uniform moving window proposal distribution, $U(L_t, U_t)$. The prior distribution for $r^*_{jk}$ is $U(0, 1)$. The candidate parameters may be accepted with probability min(1, $r_{MH}$) where $r_{MH}$ is defined in Eqn. 1.

The MHG step for $c_j$ may include drawing $c_j$ from a uniform moving window proposal distribution, $U(L_t, U_t)$. The prior distribution for $c_j$ may be $U(0, 3)$. The candidate parameters may be accepted with probability min(1, $r_{MH}$) where $r_{MH}$ is defined in Eqn. 1.

The model algorithm's examinee and proficiency space parameter meta-step may include: (1) a MHG step for $\lambda_k$, for each attribute separately; (2) a MHG step for $\kappa_k$, for each attribute separately; (3) a MHG step for $g_i$, for each examinee i; (4) a MHG step for $\beta_{kl}$, separately for each covariate l, attribute k, and $\theta$; (5) a Gibbs step for each attribute parameter $\alpha_{ik}$, for each examinee i; and (6) a MHG step for $\theta_i$, for each examinee i.

The MHG step for $\lambda_k$ may include drawing $\lambda_k$ from a uniform moving window proposal distribution, $U(L_t, U_t)$. The prior distribution for $\lambda_k$ may be $U(-1, 1)$. The candidate parameters may be accepted with probability $\min(1, r_{MH})$ where $r_{MH}$ is defined in Eqn. 1.

The MHG step for $K_k$ may include drawing $K_k$ from a uniform moving window proposal distribution, $U(L_t, U_t)$. The prior distribution for $K_k$ may be $U(-4, 4)$. The candidate parameters may be accepted with probability $\min(1, r_{MH})$ where $r_{MH}$ is defined in Eqn. 1.

The MHG step for $g_i$ may include drawing $g_i$ from a uniform moving window proposal distribution, $U(L_t, U_T)$. The prior distribution for $g_i$ may be $N(0, 1)$. The candidate parameters may be accepted with probability $\min(1, R_{MH})$ where $T_{MH}$ is defined in Eqn. 1.

The MHG step for $\beta_k$ may include drawing $\beta_k$ from a uniform moving window proposal distribution, $U(L_t, U_t)$. The prior distribution for $\beta_k$ may be $U(-4, 4)$. The candidate parameters may be accepted with probability $\min(1, r_{MH})$ where $r_{MH}$ is defined in Eqn. 1.

$$\Phi\left(\frac{\beta_k y_i + \lambda_k g_i - \kappa_k}{\sqrt{1-\lambda_k^2}}\right).$$

The prior distribution for $\alpha_{ik}$ may be $\alpha_{ik}$ may be drawn from a Bernoulli distribution with probability of success equal to $$\frac{P(x_i \mid \alpha_{ik}=1, \Psi)P(\alpha_{ik}=1)}{\sum_{l=0}^{1} P(x_i \mid \alpha_{ik}=l, \Psi)P(\alpha_{ik}=l)}.$$

The MHG step for $\theta_i$ may include drawing $\theta_i$ from a uniform moving window proposal distribution, $U(L_t, U_t)$. The prior distribution for $\theta_i$ may be $N(\beta_\theta y_i + \lambda_\theta g_i, 1-\lambda_\theta^2)$. The candidate parameters may be accepted with probability $\min(1, r_{MH})$ where $r_{MH}$ is defined in Eqn. 1.

In alternate embodiments of the above-described MCMC algorithm, one or more of $\beta$, $\lambda$ and $\kappa$ may be set to zero. If $\beta=0$, the fourth step of the examinee/proficiency space meta-step need be skipped. If $\lambda=0$, the first step of the examinee/proficiency space meta-step may be skipped. If $\kappa=0$, the second step of the examinee/proficiency space meta-step may be skipped. If $\beta=0$ and $\lambda=0$, the first and fourth steps of the examinee/proficiency space meta-step may be skipped, and the prior distributions for $\alpha_{ik}$ and $\theta_i$ equal $\phi(\kappa_k)$ and $N(0, 1)$, respectively.

In an alternate embodiment, a model incorporating polytomous attributes is described. Current models for cognitive diagnosis do not allow for polytomous attributes (attribute values other than zero or one). While most of these models work well with dichotomous attributes, situations occur, in practice, where attributes are not dichotomous. For example, if examinees are classified into three levels for meeting educational standards, such as "below standards," "meeting standards" and "exceeding standards," present cognitive diagnosis models cannot handle such a classification. Standards-based classification of this sort is typically performed at the level of specific content areas, such as mathematics, although any and all uses are encompassed within the scope of the present invention. In the context of cognitive diagnosis, this classification may be considered to create trichotomous attributes, where a score of zero on an attribute may indicate that an examinee is below the standard, a score of one may indicate that the examinee meets the standard, and a score of two may indicate that the examinee exceeds the standard.

The above-described example is common in standards-based assessments. An important characteristic of the classification may be that the three classes for each attribute form an ordered set in which examinees who are in the highest class also possess the attribute levels guaranteed by each of the lower classes. In other words, the skill level implied by a class exceeds that of all lesser classes. More or fewer classes may be used in a polytomous attribute classification.

A method incorporating polytomous attributes may be generated, for example, by defining a set of general functions that relate the item response function to the level of the attribute. For example, if a method of describing the item-attribute level relationship as a function of the level of the examinee attribute $\alpha_{ik}$, and the Q-matrix entry for the $j^{th}$ attribute, $q_{jk}$, defined generally as $f_{jk}(\alpha_{ik}, q_{jk})$. For the RUM, a natural transition exists from $f_{jk}(\alpha_{ik}, q_{jk})$ defined for dichotomous attributes to $f_{jk}(\alpha_{ik}, q_{jk})$ defined for polytomous attributes. Accordingly, the polytomous attribute version of the RUM is defined as $$P(X_{ij}=1 \mid \alpha_i, \theta_i) = \pi_j^* \prod_{k=1}^{K} r_{jk}^{*f_{jk}(\alpha_{ik}, q_{jk})} P_{c_j}(\theta_i).$$

The general nature of $f_{jk}(\alpha_{ik}, q_{jk})$ may allow for any type of function of attribute and Q-matrix entry to affect the model likelihood. In an embodiment, the model assumes that each attribute k has discrete levels $0, 1, \ldots, p$. Restrictions may be placed on the model to incorporate the ordered nature of the classification. For example, such restrictions may include the following:

$$f_{jk}(\alpha_{ik}=0, q_{jk}=1)=1; \tag{1}$$

$$f_{jk}(\alpha_{ik}=p, q_{jk}=1)=0; \text{ and} \tag{2}$$

$$f_{jk}(\alpha_{ik}=1, q_{jk}=1) > f_{jk}(\alpha_{ik}=2, q_{jk}=1) > \ldots > f_{jk}(\alpha_{ik}=p-1, q_{jk}=1). \tag{3}$$

Conditions (1) and (2) may define the upper and lower limits of the attribute function. Condition (3), a monotonic decreasing ordering of the attribute function, may define the structure of the relationship between the attribute levels and the item response function. Examinees having attribute level zero may have the complete application of the r* reduction to the $\pi^*$ parameter. In other words, such examinees may be guessing without any knowledge of the attribute. Examinees having attribute level p may not have a reduction to the $\pi^*$ parameter, indicating complete knowledge of the attribute. Examinees having an attribute level z between zero and p have a decreased reduction of $\pi^*$. In other words, the item response probability may increase as the attribute level increases.

Another benefit to the parameterization of the polytomous attribute RUM may be the ability to incorporate an ordered polytomous attribute structure using a small number of parameters. $f_{jk}(\alpha_{ik}, q_{jk})$ requires p-1 additional parameters for each Q-matrix entry.

Depending upon the number of entries in the Q-matrix, the number of $f_{jk}(\alpha_{ik}, q_{jk})$ parameters may become very large. In an embodiment, the constraint: $f_{1k}(\alpha_{ik}=p, q_{jk}=1) = f_{2k}(\alpha_{ik}=p, q_{jk}=1) = \ldots = f_{jk}(\alpha_{ik}=p, q_{jk}=1) \forall p \neq \{0,1\}$ may be used to provide a method of incorporating polytomous attributes using a single parameter per attribute level.

The process of modeling polytomous attributes may include a model for the proficiency space. The incorporation of ordered polytomous attributes may require an additional set of proficiency space parameters. Specifically, the ordered polytomous attribute analog of the dichotomous model presented above may include a set of p−1 cut point parameters for each attribute, denoted by the second subscript in $\kappa_{kp}$. As with the dichotomous model, $\overline{\alpha}_{ik}=\beta_k Y_i+\lambda_k G_i+e_{ek}$, where $I(\alpha_{ik}=p)=I(\overline{a}_{ik}>\kappa_{kl})$ and $\kappa_{kl}$ is the attribute level-specific cut point that determines the population proportion of examinees at level z. The elements of vector $\beta_k$ are the weights of the corresponding covariates contained in the vector $Y_i$. The parameter $\lambda_k$ is the loading of attribute k onto the higher order trait $G_i$. $\lambda_k$ may range between (−1, 1), although positive values are expected in the context of mental traits. $e_{ik}$ includes error terms having a form $N(0,1-\lambda_k^2)$ which are independent of $G_i$ and $Y_i$ for all i. Accordingly, $P(\overline{\alpha}_{ik}|G_i=g_i,Y_i=y_i)\sim N(\beta_k y_i+\lambda_k g_i,1-\lambda_k^2)$, where $g_i$ is the realization of the higher order trait $G_i$. The hierarchical Bayesian prior distribution is thus:

$$P(\alpha_{ik}=l\mid G_i=g_i, Y_i=y_i)=P(\overline{\alpha}_{ik}>\kappa_{kl}\mid g_i,y_i)-P(\overline{\alpha}_{ik}>\kappa_{k(l+1)}\mid g_i,y_i)=\Phi\left(\frac{\beta_k y_i+\lambda_k g_i-\kappa_{k(l+1)}}{\sqrt{1-\lambda_k^2}}\right)-\Phi\left(\frac{\beta_k y_i+\lambda_k g_i-\kappa_{kl}}{\sqrt{1-\lambda_k^2}}\right),$$

where $\Phi(\Omega)$ is the standard normal CDF.

The likelihood values of the polytomous attributes are defined by the location of continuous variable $\alpha_{ik}$ in relation to a set of threshold parameters, $\kappa_{k0}, \kappa_{k1}, \ldots, \kappa_{kp}$, where there are p attribute levels for attribute k. By definition, $\kappa_{k0}=-\infty$ and $\kappa_{k(p+1)}=\infty$. The incorporation of multiple levels for each attribute may render the current parameterization as a model for the polychoric correlations between the attribute parameters.

The RUM features a continuous examinee parameter, $\theta_i$, which may be modeled as $\theta_i=\beta_\theta Y_i+\lambda_\theta G_i+e_{i\theta}$ and $P(\theta|G_i=g_i, Y_i=y_i)\sim N(\beta_\theta y_i+\lambda_\theta g_i,1-\lambda_\theta^2)$.

The algorithm for the estimation of the RUM using the generalized linear mixed proficiency space model may include two meta-steps: modeling the item parameters and modeling the examinee and proficiency space parameters. Each of the item parameters may be examined separately. Then, each of the parameters in the proficiency space model may be examined before the examinee parameters ($\alpha_{ik}$ and $\theta_i$) are separately examined for each examinee.

In an embodiment, a model MCMC algorithm uses both Gibbs sampling (for the examinee attribute parameters) and the Metropolis-Hastings within Gibbs algorithm (MHG). Other embodiments of the MCMC algorithm may use only the Gibbs sampling or MHG for all parameters or use Gibbs sampling or MHG for different parameters than in the described MCMC algorithm. For each MHG step, candidate values may be drawn from a moving window family of proposal distributions. Under MHG, for a given item parameter $\tau$, the probability of acceptance of a candidate parameter $\tau^*$ is min(1, $r_{MH}$), where $$r_{MH}=\prod_{i=1}^{I}\prod_{j=1}^{J}\frac{\left[(P_{RUM}(\tau^*))^{X_{ij}}(1-P_{RUM}(\tau^*))^{(1-X_{ij})}\right]}{\left[(P_{RUM}(\tau_{t-1}))^{X_{ij}}(1-P_{RUM}(\tau_{t-1}))^{(1-X_{ij})}\right]}\cdot\frac{P(\tau^*)Q(\tau_{t-1}\mid\tau^*)}{P(\tau_{t-1})Q(\tau^*\mid\tau_{t-1})},$$ (Eqn. 1)

where $\tau^{t-1}$ is the value of the parameter from the previous step in the chain. The function $P_{RUM}(\tau)$ is the likelihood value of an item response function, such as $$\pi_j^*\prod_{k=1}^{K}r_{jk}^{*(1-a_{ik})\times q_{jk}}P_{c_j}(\theta_i),$$

using the data and the parameters specified in the chain. The values $Q(\tau_{t-1}|\tau^*)$ and $Q(\tau^*|\tau_{t-1})$ are the proposal probabilities given by the ratio of heights of the uniform proposal distributions. The values $P(\tau^*)$ and $P(\tau_{t-1})$ are the prior distribution probabilities of the parameters.

The model algorithm's item parameter meta-step (performed over all items j) may include: (1) a MHG step for $\pi^*_j$; (2) a MHG step for $r^*_{jk}$, for each parameter separately, with parameters specified by the Q-matrix; (3) a MHG step for $c_j$; and (4) a MHG step for $f_{jk}(\alpha_{ik}=p,q_{jk}=1)$ for each parameter separately, with parameters specified by the Q-matrix.

The MHG step for $\pi^*_j$ may include drawing $\pi^*_j$ from a uniform moving window proposal distribution, $U(L_t, U_t)$. The prior distribution for $\pi^*_j$ is $U(0, 1)$. The candidate parameters may be accepted with probability min(1, $r_{MH}$) where $r_{MH}$ is defined in Eqn. 1.

The MHG step for $r^*_{jk}$ may include drawing $r^*_{jk}$ from a uniform moving window proposal distribution, $U(L_t, U_t)$. The prior distribution for $r^*_{jk}$ is $U(0, 1)$. The candidate parameters may be accepted with probability min(1, $r_{MH}$) where $r_{MH}$ is defined in Eqn. 1.

The MHG step for $c_j$ may include drawing $C_j$ from a uniform moving window proposal distribution, $U(L_t, U_t)$. The prior distribution for $c_j$ may be $U(0, 3)$. The candidate parameters may be accepted with probability min(1, $r_{MH}$) where $r_{MH}$ is defined in Eqn. 1.

The MHG step for $f_{jk}(\alpha_{ik}=p,q_{jk}=1)$ may include drawing $f_{jk}(\alpha_{ik}=p,q_{jk}=1)$ from a uniform moving window proposal distribution, $U(L_t, U_t)$. The prior distribution for $f_{jk}(\alpha_{ik}=p, q_{jk}=1)$ may be $U(0, 1)$. The candidate parameters may be accepted with probability min(1, $r_{MH}$) where $r_{MH}$ is defined in Eqn. 1.

The model algorithm's examinee and proficiency space parameter meta-step may include: (1) a MHG step for $\lambda_k$, for each attribute separately; (2) a MHG step for $\kappa_{k,p}$, for each attribute separately; (3) a MHG step for $g_i$, for each examinee i; (4) a MHG step for $\beta_{kl}$, separately for each covariate l, attribute k, and $\theta$; (5) a Gibbs step for each attribute parameter $\alpha_{ik}$, for each examinee i; and (6) a MHG step for $\theta_i$, for each examinee i.

The MHG step for $\lambda_k$ may include drawing $\lambda_k$ from a uniform moving window proposal distribution, $U(L_t, U_t)$. The prior distribution for $\lambda_k$ may be $U(-1, 1)$. The candidate parameters may be accepted with probability min(1, $r_{MH}$) where $r_{MH}$ is defined in Eqn. 1.

The MHG step for $\kappa_{kl}$ may include drawing $\kappa_{kl}$ from a uniform moving window proposal distribution, $U(L_t, U_t)$. The prior distribution for $\kappa_{kl}$ may be $U(-4, 4)$. The candidate parameters may be accepted with probability min(1, $r_{MH}$) where $r_{MH}$ is defined in Eqn. 1.

The MHG step for $g_i$ may include drawing $g_i$ from a uniform moving window proposal distribution, $U(L_t, U_t)$. The prior distribution for $g_i$ may be $N(0, 1)$. The candidate parameters may be accepted with probability min(1, $r_{MH}$) where $r_{MH}$ is defined in Eqn. 1.

The MHG step for $\beta_k$ may include drawing $\beta_k$ from a uniform moving window proposal distribution, $U(L_t, U_t)$. The prior distribution for $\beta_k$ may be U(-4, 4). The candidate parameters may be accepted with probability min(1, $r_{MH}$) where $r_{MH}$ is defined in Eqn. 1.

The prior distribution for $\alpha_{ik}$ may be $$\Phi\left(\frac{\beta_k y_i + \lambda_k g_i - \kappa_{k(l+1)}}{\sqrt{1-\lambda_k^2}}\right) - \Phi\left(\frac{\beta_k y_i + \lambda_k g_i - \kappa_{kl}}{\sqrt{1-\lambda_k^2}}\right).$$

$\alpha_{ik}$ may be drawn from a Bernoulli distribution with probability of success equal to $$P(\alpha_{ik} = l \mid x_i, \Psi) = \frac{P(x_i \mid \alpha_{ik} = 1, \Psi) P(\alpha_{ik} = l)}{\sum_{z=0}^{P} P(x_i \mid \alpha_{ik} = z, \Psi) P(\alpha_{ik} = z)}.$$

The MHG step for $\theta_i$ may include drawing $\theta_i$ from a uniform moving window proposal distribution, $U(L_t, U_t)$. The prior distribution for $\theta_i$ may be $N(\beta_\theta y_i + \lambda_\theta g_i, 1-\lambda_\theta^2)$. The candidate parameters may be accepted with probability min(1, $r_{MH}$) where $r_{MH}$ is defined in Eqn. 1.

It is to be understood that the invention is not limited in its application to the details of construction and to the arrangements of the components set forth in this description or illustrated in the drawings. The invention is capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

The invention claimed is:

1. A computer-implemented method for determining examinee attribute mastery levels, the method comprising:
    (a) for each item on an assessment, determining an estimated value for each of one or more item parameters with a computer;
    (b) for each proficiency space parameter for an attribute tested via the assessment, determining an estimated value for the proficiency space parameter with the computer;
    (c) for each examinee parameter, determining an estimated value for the examinee parameter for each examinee with the computer, wherein determining the estimated value for the examinee parameter for each examinee includes: for each attribute, performing a Metropolis-Hastings within Gibbs step to update an estimate of an overall skill level weighting factor,
    for each attribute, performing a Metropolis-Hastings within Gibbs step to update an estimate of a mastery threshold, for each examinee, performing a Metropolis-Hastings within Gibbs step to update an estimate of an overall skill level for an examinee, and for each covariate, attribute and continuous examinee parameter, performing a Metropolis-Hastings within Gibbs step to update an estimate of each element of a covariate weighting vector;
    (d) repeating (a) through (c) a predetermined number of iterations; and
    (e) determining one or more examinee attribute mastery levels with the computer based on the item parameters, proficiency space parameters, and examinee parameters.

2. The method of claim 1 wherein performing a Metropolis-Hastings within Gibbs step to update an estimate of an overall skill level weighting factor comprises: selecting an estimated overall skill level weighting factor from a moving window distribution.

3. The method of claim 1 wherein performing a Metropolis-Hastings within Gibbs step to update an estimate of an overall skill level weighting factor comprises:
    accepting a value for the estimated skill level weighting factor with a likelihood that is the minimum of one and the product, for all items and examinees, of i) either a) a probability of an examinee correctly answering an item with the estimated skill level weighting factor if the examinee answered the item correctly or b) one minus a probability of the examinee incorrectly answering the item with the estimated skill level weighting factor if the examinee answered the item incorrectly, ii) a prior probability of the estimated skill level weighting factor and iii) a first proposal probability divided by the product, for all items and examinees, of iv) either a) a probability of the examinee correctly answering an item with a previous computed skill level weighting factor if the examinee answered the item correctly or b) one minus a probability of the examinee incorrectly answering the item with the previous computed skill level weighting factor if the examinee answered the item incorrectly, v) a prior probability of the previous computed skill level weighting factor and vi) a second proposal probability.

4. The method of claim 1 wherein the prior distribution for an estimated overall skill level weighting factor comprises a uniform distribution between -1 and 1.

5. The method of claim 1 wherein performing a Metropolis-Hastings within Gibbs step to update an estimate of each of one or more mastery thresholds comprises: selecting, for each mastery threshold, an estimated mastery threshold from a moving window distribution.

6. The method of claim 1 wherein performing a Metropolis-Hastings within Gibbs step for updating to update an estimate of each of one or more mastery thresholds comprises: for each mastery threshold, accepting a value for the estimated mastery threshold with a likelihood that is the minimum of one and the product, for all items and examinees, of i) either a) a probability of an examinee correctly answering an item with the estimated mastery threshold if the examinee answered the item correctly or b) one minus a probability of the examinee incorrectly answering the item with the estimated mastery threshold if the examinee answered the item incorrectly, ii) a prior probability of the estimated mastery threshold and iii) a first proposal probability divided by the product, for all items and examinees, of iv) either a) a probability of the examinee correctly answering an item with a previous computed mastery threshold if the examinee answered the item correctly or b) one minus a probability of the examinee incorrectly answering the item with the previous computed mastery threshold if the examinee answered the item incorrectly, v) a prior probability of the previous computed mastery threshold and vi) a second proposal probability.

7. The method of claim 1 wherein the prior distribution for each estimated mastery threshold comprises a uniform distribution between -4 and 4.

8. The method of claim 1 wherein performing a Metropolis-Hastings within Gibbs step to update an estimate of an overall skill level for the examinee comprises: selecting an estimated overall skill level from a moving window distribution.

9. The method of claim 1 wherein performing a Metropolis-Hastings within Gibbs step to update an estimate of an overall skill level for the examinee comprises: accepting a value for the estimated overall skill level with a likelihood that is the minimum of one and the product, for all items and examinees, of i) either a) a probability of an examinee correctly answering an item with the estimated overall skill level if the examinee answered the item correctly or b) one minus a probability of the examinee incorrectly answering the item with the estimated overall skill level if the examinee answered the item incorrectly, ii) a prior probability of the estimated overall skill level and iii) a first proposal probability divided by the product, for all items and examinees, of iv) either a) a probability of the examinee correctly answering an item with a previous computed overall skill level if the examinee answered the item correctly or b) one minus a probability of the examinee incorrectly answering the item with the previous computed overall skill level if the examinee answered the item incorrectly, v) a prior probability of the previous computed overall skill level and vi) a second proposal probability.

10. The method of claim 1 wherein the prior distribution for an estimated overall skill level comprises a normal distribution having a mean equal to 0 and a variance equal to 1.

11. The method of claim 1 wherein performing a Metropolis-Hastings within Gibbs step to update an estimate for each element of a covariate weighting vector comprises: for each element of a covariate weighting vector, selecting an estimate for the element from a moving window distribution.

12. The method of claim 1 wherein performing a Metropolis-Hastings within Gibbs step to update an estimate for each element of a covariate weighting vector comprises: accepting an estimate for an element of a covariate weighting vector with a likelihood that is the minimum of one and the product, for all items and examinees, of i) either a) a probability of an examinee correctly answering an item with the estimated element if the examinee answered the item correctly or b) one minus a probability of the examinee incorrectly answering the item with the estimated element if the examinee answered the item incorrectly, ii) a prior probability of the estimated element and iii) a first proposal probability divided by the product, for all items and examinees, of iv) either a) a probability of the examinee correctly answering an item with a previous computed element if the examinee answered the item correctly or b) one minus a probability of the examinee incorrectly answering the item with the previous computed element if the examinee answered the item incorrectly, v) a prior probability of the previous computed element and vi) a second proposal probability.

13. The method of claim 1 wherein a prior distribution for the estimated element of the covariate weighting vector comprises a uniform distribution between −4 and 4.

14. The method of claim 1 wherein step (d) comprises, for each examinee:
performing a Gibbs step to update an estimate of an examinee attribute mastery level;
performing a Metropolis-Hastings within Gibbs step to update an estimate of a latent ability value.

15. The method of claim 14 wherein performing the Gibbs step comprises:
selecting an examinee attribute value from a normal distribution having a mean equal to the sum of a vector product of the covariate weighting vector and a covariate vector and a product of the overall skill level weighting factor and the overall skill level, and a variance equal to one minus the overall skill level weighting factor squared; and
determining an examinee attribute master level based on the examinee attribute value and one or more mastery thresholds.

16. The method of claim 14 wherein the prior distribution for an estimated examinee attribute mastery level comprises a standard normal cumulative distribution function of a product of a covariate weighting factor vector and a covariate vector plus the product of an overall skill value weighting factor and an overall skill value minus a mastery threshold all divided by the square root of one minus the overall skill value weighting factor squared.

17. The method of claim 16 wherein the examinee attribute mastery level is drawn from a Bernoulli distribution with probability of success equal to the product of a probability that the examinee answers a question correctly given that the examinee is a master of the particular attribute, a set of item parameters and attribute parameters and the prior distribution that the examinee is a master of the particular attribute divided by the sum of i) the product of a probability that the examinee answers the question correctly given that the examinee is not a master of the particular attribute, a set of item parameters and attribute parameters and the prior distribution that the examinee is not a master of the particular attribute and ii) the product of a probability that the examinee answers a question correctly given that the examinee is a master of the particular attribute, a set of item parameters and attribute parameters and the prior distribution that the examinee is a master of the particular attribute.

18. The method of claim 14 wherein the prior distribution for an estimated examinee attribute mastery level comprises the difference between i) a standard normal cumulative distribution function of a product of a covariate weighting factor vector and a covariate vector plus the product of an overall skill value weighting factor and an overall skill value minus a first mastery threshold all divided by the square root of one minus the overall skill value weighting factor squared and ii) a standard normal cumulative distribution function of a product of the covariate weighting factor vector and the covariate vector plus the product of the overall skill value weighting factor and the overall skill value minus a second mastery threshold all divided by the square root of one minus the overall skill value weighting factor squared.

19. The method of claim 18 wherein the examinee attribute mastery level is drawn from a Bernoulli distribution with probability of success equal to the product of a probability that an examinee answers a question correctly given that the particular attribute is mastered for a set of item parameters and attribute parameters and the prior distribution for the estimated examinee attribute mastery level divided by the sum of the products, for each examinee attribute mastery level, of the probability that the examinee answers the question correctly if the examinee has the examinee attribute mastery level, a set of item parameters and attribute parameters and the prior distribution for the examinee attribute mastery level.

20. The method of claim 14 wherein performing the Metropolis-Hastings within Gibbs step comprises:
selecting an estimated latent ability value from a moving window distribution.

21. The method of claim 14 wherein performing the Metropolis-Hastings within Gibbs step comprises:
accepting a value for the estimated latent ability value with a likelihood that is the minimum of one and the product, for all items and examinees, of i) either a) a probability of an examinee correctly answering an item with the estimated latent ability value if the examinee answered the item correctly or b) one minus a probability of the examinee incorrectly answering the item with the estimated latent ability value if the examinee answered the item incorrectly, ii) a prior probability of the estimated latent ability value and iii) a first proposal probability divided by the product, for all items and examinees, of iv) either a) a probability of the examinee correctly answering an item with a previous computed latent ability value if the examinee answered the item correctly or b) one minus a probability of the examinee incorrectly answering the item with the previous computed latent ability value if the examinee answered the item incorrectly, v) a prior probability of the previous computed latent ability value and vi) a second proposal probability.

22. The method of claim 14 wherein the prior distribution for an estimated latent ability value comprises a normal distribution having a mean equal to the sum of the vector product of a covariate weighting factor vector and a covariate vector and the product of an overall skill value weighting factor and an overall skill value and a variance equal to one minus the overall skill value weighting factor squared.

\* \* \* \* \*